United States Patent
Chang et al.

(10) Patent No.: US 11,644,296 B1
(45) Date of Patent: May 9, 2023

(54) 3D MEASURING EQUIPMENT AND 3D MEASURING METHOD

(71) Applicant: Industrial Technology Research Institute, Hsinchu (TW)

(72) Inventors: Chin-Chia Chang, Tainan (TW); Chia-Ching Lin, Tainan (TW); Yi-Tong Liu, New Taipei (TW); Chia-Ming Tsai, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 17/690,009

(22) Filed: Mar. 9, 2022

(30) Foreign Application Priority Data

Dec. 17, 2021 (TW) .................................. 110147314

(51) Int. Cl.
G01B 5/20 (2006.01)
G01B 5/004 (2006.01)

(52) U.S. Cl.
CPC .............. *G01B 5/20* (2013.01); *G01B 5/004* (2013.01)

(58) Field of Classification Search
CPC ...................................................... G01B 5/20
USPC .................................. 33/568, 557, 551, 552
See application file for complete search history.

(56) References Cited

U.S. PATENT DOCUMENTS

| | | | | |
|---|---|---|---|---|
| 5,026,033 A | * | 6/1991 | Roxy | B23Q 3/103 269/45 |
| 5,107,599 A | * | 4/1992 | Marincic | G01B 5/0004 269/45 |
| 5,193,286 A | * | 3/1993 | Collier | G01B 21/20 33/DIG. 2 |
| 5,481,811 A | * | 1/1996 | Smith | B25B 31/005 33/573 |
| 5,625,959 A | * | 5/1997 | Ercole | G01B 5/0002 33/573 |

(Continued)

FOREIGN PATENT DOCUMENTS

| CN | 102175177 | 9/2011 |
|---|---|---|
| CN | 102490133 | 6/2012 |

(Continued)

OTHER PUBLICATIONS

"Office Action of Taiwan Counterpart Application", dated Nov. 2, 2022, p. 1-p. 5.

(Continued)

*Primary Examiner* — George B Bennett
(74) *Attorney, Agent, or Firm* — JCIPRNET

(57) ABSTRACT

A 3D measuring equipment and a 3D measuring method are provided. The 3D measuring equipment includes a base, a fixture, a measuring device, and a controller. The fixture is disposed on the base for an object to be measured to be disposed thereon. The fixture has a plurality of rods. The heights of the rods are adjustable. The measuring device is installed on the base and is movable relative to the fixture. The controller is connected to the measuring device and the fixture and configured to perform the following. The heights of the rods are adjusted according to 3D model data of the object to be measured to support the object to be measured. The measuring device is driven to move relative to the fixture to measure the object to be measured.

21 Claims, 3 Drawing Sheets

(56) References Cited

U.S. PATENT DOCUMENTS

| | | | | |
|---|---|---|---|---|
| 5,883,313 | A * | 3/1999 | Ercole | G01B 7/287 73/865.8 |
| 6,119,353 | A * | 9/2000 | Grønskov | G01M 5/0091 73/146 |
| 8,453,337 | B2 * | 6/2013 | Lacy | G01B 5/0004 33/503 |
| 8,650,767 | B2 | 2/2014 | Matsumiya et al. | |
| 8,745,889 | B2 * | 6/2014 | Fischer | G01B 7/105 33/832 |

FOREIGN PATENT DOCUMENTS

| | | |
|---|---|---|
| CN | 104589242 | 5/2015 |
| CN | 106908014 | 6/2017 |
| CN | 107024184 | 8/2017 |
| CN | 109373898 | 2/2019 |
| JP | 2010008193 | 1/2010 |
| JP | 2018179975 | 11/2018 |
| TW | 200408793 | 6/2004 |
| TW | 200606396 | 2/2006 |
| TW | 201028643 | 8/2010 |
| TW | I388797 | 3/2013 |
| TW | I438396 | 5/2014 |
| TW | 201514446 | 4/2015 |
| TW | I632342 | 8/2018 |
| TW | I667529 | 8/2019 |
| TW | I692635 | 5/2020 |
| TW | I739693 | 9/2021 |

OTHER PUBLICATIONS

Nikola Vukašinović et al., "The Influence of Surface Topology on the Accuracy of Laser Triangulation Scanning Results", Journal of Mechanical Engineering, Jan. 2010, pp. 23-30.

Matthias Marcus Auerswald et al., "Optical sensor system for 3D measurements on large gears", AMA Conferences 2017—SENSOR 2017 and IRS2, May 30, 2017-Jun. 1, 2017, pp. 227-232.

Marc Pillarz et al. "Gear Shape Measurement Potential of Laser Triangulation and Confocal-Chromatic Distance Sensors", Sensors, Jan. 30, 2021, pp. 1-22.

* cited by examiner

3D MEASURING EQUIPMENT AND 3D MEASURING METHOD

CROSS-REFERENCE TO RELATED APPLICATION

This application claims the priority benefit of Taiwan application serial no. 110147314, filed on Dec. 17, 2021. The entirety of the above-mentioned patent application is hereby incorporated by reference herein and made a part of this specification.

TECHNICAL FIELD

The disclosure relates to a measuring equipment and a measuring method, and in particular, to a 3D measuring equipment and a 3D measuring method.

BACKGROUND

For products such as curved glass, if a quality check can be performed after the manufacture by adopting non-contact optical measurement, it is helpful to increase the product yield. However, in the conventional technology, to measure the manufactured products, it is required to move manufactured products from the original assembly line to exclusive measuring equipment, which not only takes time and cost to move the products but also requires additional cleaning manufacturing process to make the measured products enter the further assembly line, let alone a risk of being damaged in the moving process. In addition, in the conventional technology, different curved products have to be supported by different fixtures to properly support the curved products for measurement. However, a cost of the fixtures required for the measurement is greatly increased.

SUMMARY

The disclosure provides a 3D measuring equipment and a 3D measuring method capable of reducing time and cost required for measurement.

A 3D measuring equipment of the disclosure includes a base, a fixture, a measuring device and a controller. The fixture is disposed on the base for an object to be measured to be disposed thereon. The fixture has multiple rods. The heights of the rods are adjustable. The measuring device is installed on the base and is movable relative to the fixture. The controller is signally connected to the measuring device and the fixture and is configured to execute the following. The heights of the rods are adjusted according to 3D model data of the object to be measured to support the object to be measured. The measuring device is driven to move relative to the fixture to measure the object to be measured.

A 3D measuring method of the disclosure includes the following. 3D model data of an object to be measured is obtained. The heights of multiple rods of a fixture are adjusted according to the 3D model data of the object to be measured to support the object to be measured. A measuring device is driven to move relative to the fixture to measure the object to be measured.

Based on the above, the 3D measuring equipment and the 3D measuring method of the disclosure may be integrated in a manufacturing assembly line to reduce the time and the cost required for the measurement, and the fixture is adjustable to be applied to various objects to be measured.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
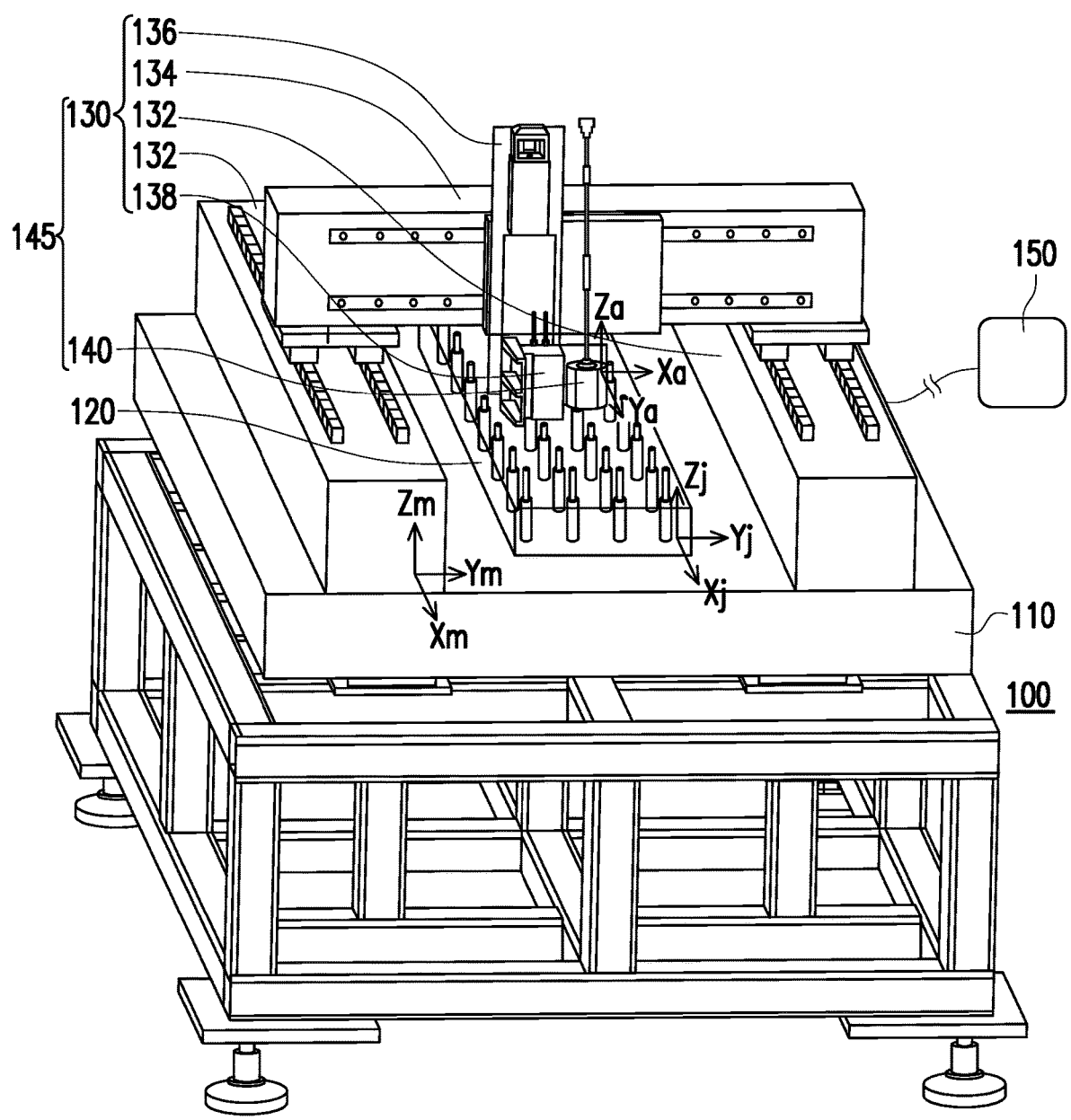
FIG. 1 is a schematic diagram of a 3D measuring equipment according to an embodiment of the disclosure.

FIG. 1 is a schematic diagram of a 3D measuring equipment according to an embodiment of the disclosure. Referring to FIG. 1, a 3D measuring equipment 100 of the embodiment includes a base 110, a fixture 120, a measuring device 145, and a controller 150. The fixture 120 is disposed on the base 110 for an object 50 (shown in FIG. 2A) to be measured to be disposed thereon. The fixture 120 has multiple rods 122. The heights of the rods 122 are adjustable. The measuring device 145 is installed on the base 110 and is movable relative to the fixture 120. The controller 150 is signally connected to the measuring device 145 and the fixture 120. The measuring device 145 of the embodiment may include a driving unit 130 and a measuring element 140; however, the disclosure is not limited thereto. The driving unit 130 is installed on the base 110 and is signally connected to the controller 150. The measuring element 140 is installed on the driving unit 130.

Figure 2A:
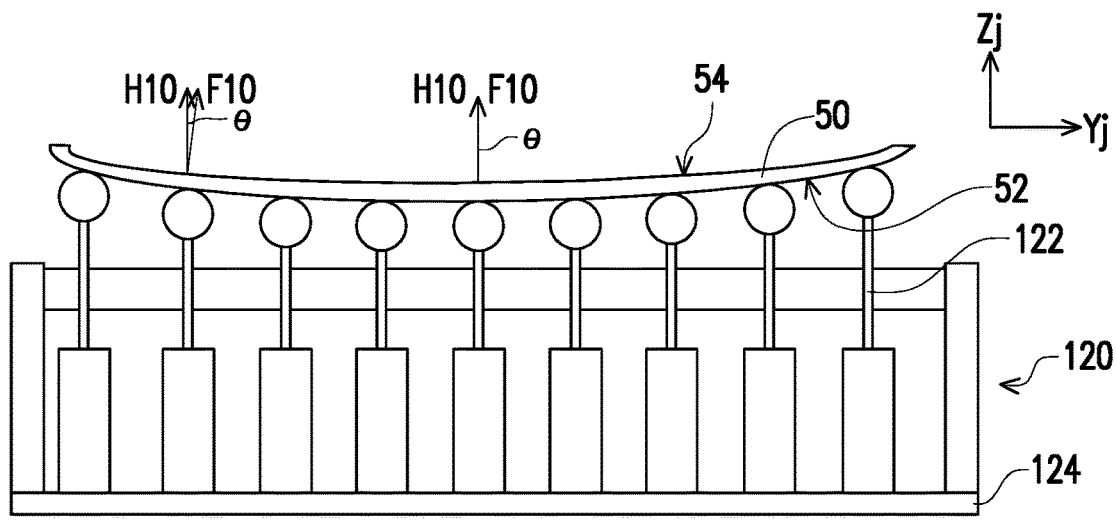
FIG. 2A and FIG. 2B are schematic cross-sectional diagrams illustrating a fixture of the 3D measuring equipment of FIG. 1 supporting an object to be measured in two different states.
Figure 2B:
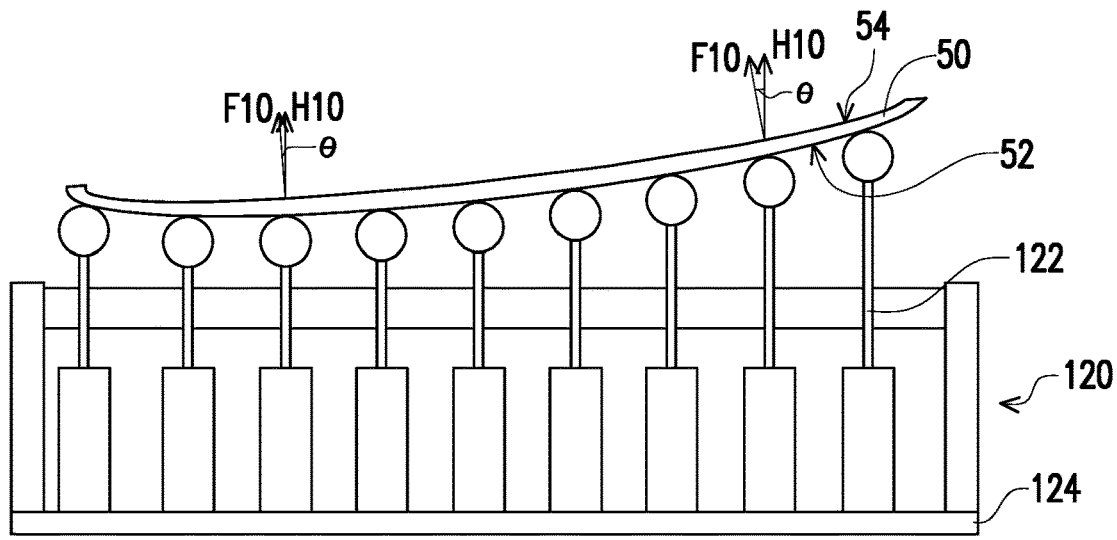

FIG. 2A and FIG. 2B are schematic cross-sectional diagrams illustrating a fixture of the 3D measuring equipment of FIG. 1 supporting an object to be measured in two different states. Referring to FIG. 1 and FIG. 2A, the heights of the rods 122 are adjustable, and the rods 122 are configured to support the object 50 to be measured. The controller 150 adjusts the heights of the rods 122 to support the object 50 to be measured according to the 3D model data of the object 50 to be measured. The rods 122, for example, contact a lower surface 52 of the object 50 to be measured. The 3D model data of the object 50 to be measured is designed before the manufacture so as to manufacture the object 50 to be measured according to the designed 3D model data. Accordingly, the 3D model data of the object 50 to be measured may be transmitted to the controller 150, and the controller 150 may determine a proper height of each of the rods 122 according to the received 3D model data of the object 50 to be measured and adjust each of the rods 122 according to the determined proper height. Hence, each of the rods 122 may contact the lower surface 52 of the object 50 to be measured and maintain a shape of the object 50 to be measured. For example, according to a surface undulation state of the object 50 to be measured, the controller 150 adjusts the heights of the rods 122 that are expected to be located below the object 50 to be measured when the measurement is performed so that the rods 122 contact the object 50 to be measured. In addition, the controller 150 may further lower the heights of the rods 122 that are not expected to contact the object 50 to be measured when the measurement is performed to the lowest to clearly define an area providing a supporting function in the fixture 120 when the measurement is performed.

Figure 3:
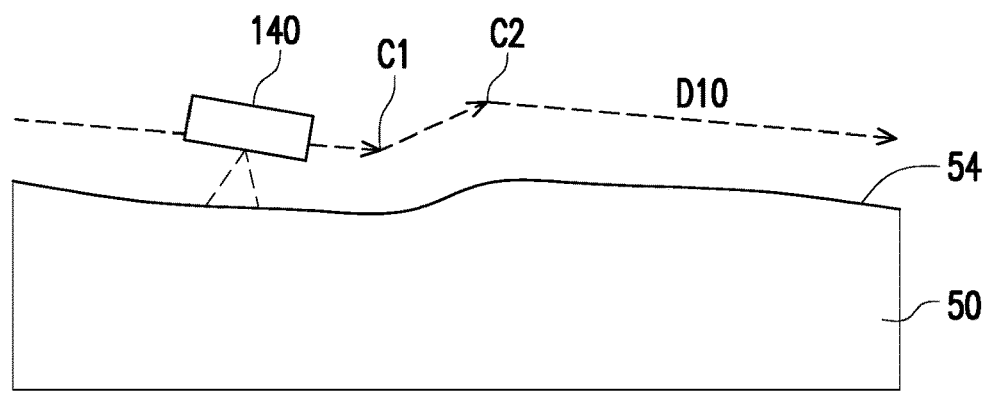
FIG. 3 is a schematic diagram illustrating a measuring element of the 3D measuring equipment of FIG. 1 performing measurement.

FIG. 3 is a schematic diagram illustrating a measuring element of the 3D measuring equipment of FIG. 1 performing measurement. Referring to FIG. 1 and FIG. 3, the controller 150 drives the measuring device 145 to move relative to the fixture 120 to measure the object 50 to be measured. In the embodiment, the driving unit 130 drives the measuring element 140 to perform tri-axial movement and uniaxial rotation. The controller 150 performs planning computation to generate measurement path data corresponding to the object 50 to be measured according to the 3D model data of the object 50 to be measured. Furthermore, the controller 150 drives the driving unit 130 to drive the measuring element 140 to measure the object 50 to be measured based on the measurement path data, such as measuring an upper surface 54 of the object 50 to be measured. For example, the controller 150 performs the planning computation to generate the measurement path data corresponding to the object 50 to be measured by minimizing a rotating angle of the uniaxial rotation of the measuring element 140 according to the 3D model data of the object 50 to be measured.

In the embodiment, the measurement path data includes, for example, coordinates of nodes C1 and C2, a moving speed of a measuring unit when performing measurement between the nodes C1 and C2, and a measurement angle of the measuring unit when performing the measurement between the nodes C1 and C2; however, the disclosure is not limited thereto. The coordinates of the nodes C1 and C2 refer to starting coordinates and ending coordinates of multiple segments of a measurement path. Here, taking a single segment as an example, the measurement path is combined by multiple continuous segments, and the measurement path data includes the starting coordinate and the ending coordinate of each of the segments.

When the controller 150 obtains the 3D model data of the object 50 to be measured, apart from calculating the proper height of each of the rods 122, position information of the upper surface 54 of the object 50 to be measured after the object 50 to be measured being supported on the fixture 120 is obtained. Therefore, the controller 150 may plan the measuring element 140 to measure the measurement path data of a measurement path P10 of the upper surface 54 of the object 50 to be measured and control the driving unit 130 to drive the measuring element 140 to measure the upper surface 54 of the object 50 to be measured along measurement path P10. In this way, it may be tested whether an appearance of the object 50 to be measured corresponds to a design value.

According to the above, since the heights of the rods 122 of the fixture 120 may be adjusted according to the 3D model data of the object 50 to be measured, the rods 122 of the fixture 120 may be configured to support the object 50 to be measured with various different appearances, thereby reducing design and manufacturing cost of an exclusive fixture. Furthermore, by adjusting the rods 122 of the fixture 120, the object 50 to be measured may be further supported on the fixture 120 with a posture suitable for measurement. In addition, the fixture 120 and the driving unit 130 are disposed on the base 110, so it is less complicated to convert the coordinates between the fixture 120 and the driving unit 130 to increase the measurement accuracy.

In the embodiment, the fixture 120 further includes a base plate element 124 disposed on the base 110. The rods 122 are disposed on the base plate element 124 and are perpendicular to the base plate element 124. The controller 150 adjusts the heights of the rods 122 so that an angle θ between a normal vector F10 of each point of the upper surface 54 of the object 50 to be measured and a height direction H10 of the rods 122 is less than a predetermined value. For example, the predetermined value is 10 degrees. The predetermined value may be adjusted according to a function of an adopted measuring element, and the disclosure is not limited thereto. The rods 122 are disposed on the base plate element 124, so the height direction H10 of the rods 122 is parallel to a coordinate axis Zj of the fixture 120 and the rods 122 move upwards and downwards along the coordinate axis Zj. Although the 3D model data of the object 50 to be measured is fixed, a posture of the object 50 to be measured supported on the fixture 120 may be adjusted by adjusting the height of each of the rods 122. When the height of each of the rods 122 is adjusted so that the each angle θ is smaller, an adjustment extent of the measuring element 140 adjusting the posture to positively face the each point of the upper surface 54 of the object 50 to be measured may be smaller, which may effectively reduce the entire measurement time.

In addition, the controller 150 may adjust the heights of the rods 122 so that a summation of the angles θ between the normal vectors F10 of all the points of the upper surface 54 of the object 50 to be measured and the height direction H10 of the rods 122 is a minimum, which also reduces the entire measurement time.

Furthermore, the controller 150 may adjust the heights of the rods 122 to minimize a deviation between the heights of the rods 122 and an average height of the rods 122 so that a difference in height of the upper surface 54 of the object 50 to be measured may not be too large, which also reduces the entire measurement time.

Referring to FIG. 2A and FIG. 2B, the angle θ in FIG. 2B is approximately greater than the angle θ in FIG. 2A, and the summation of the angles θ in FIG. 2B is also greater than the summation of the angles θ in FIG. 2A. The deviation between the heights of the rods 122 and the average height of the rods 122 in FIG. 2B is also greater than the deviation between the heights of the rods 122 and the average height of the rods 122 in FIG. 2A. Accordingly, the time required for measuring the object 50 to be measured shown in FIG. 2B is greater than the time required for measuring the object 50 to be measured shown in FIG. 2A. As a result, how to adjust the posture of the object 50 to be measured has to be considered to reduce the entire measurement time.

In the fixture 120 of the embodiment, each of the rods 122 may further include a force sensing function to determine whether the rods 122 contact the lower surface 52 of the object 50 to be measured. The height adjustment of the rods 122 may be performed by an electrically controlled motor or by further using a control measure such as a pneumatic control or a hydraulic control; however, the disclosure is not limited thereto.

Referring to FIG. 1, in the embodiment, the driving unit 130 drives the measuring element 140 to perform the tri-axial movement and the uniaxial rotation. For example, the driving unit 130 includes two first slide rails 132, a second slide rail 134, a third slide rail 136, and a mounting base 138. The first slide rails 132 are disposed apart along a coordinate axis Ym of the driving unit 130 and extend along a coordinate axis Xm of the driving unit 130. The second slide rail 134 bridges the two first slide rails 132 and may move along the coordinate axis Xm relative to the two first slide rails 132. The third slide rail 136 is orthogonally disposed on the second slide rail 134 and may move along the coordinate axis Ym relative to the second slide rail 134. The mounting base 138 is installed on the third slide rail 136, and the mounting base 138 may move along a coordinate axis Zm relative to the third slide rail 136 and rotate around the coordinate axis Xm. The mounting base 138 is configured to allow the measuring element 140 to be disposed thereon. The measuring element 140 is driven to move and perform measurement through the linear displacement along three directions of the coordinate axis Xm, the coordinate axis Ym, and the coordinate axis Zm and the rotation around the coordinate axis Xm achieved by the driving unit 130, a total of four degrees of freedom for moving. Note that the driving unit 130 is not limited to having the four degrees of freedom for moving in the embodiment. The driving unit 130 may also be, for example, a multi-axis moving unit of a robot arm.

In the embodiment, the measuring element 140 is a distance measuring element, such as an optical distance measuring element like a laser distance measuring element and the like; however, the disclosure is not limited thereto. A distance between the measuring element 140 and the object 50 to be measured is measured to compare with the design value of the 3D model data of the object 50 to be measured and confirm a product yield.

Figure 4:
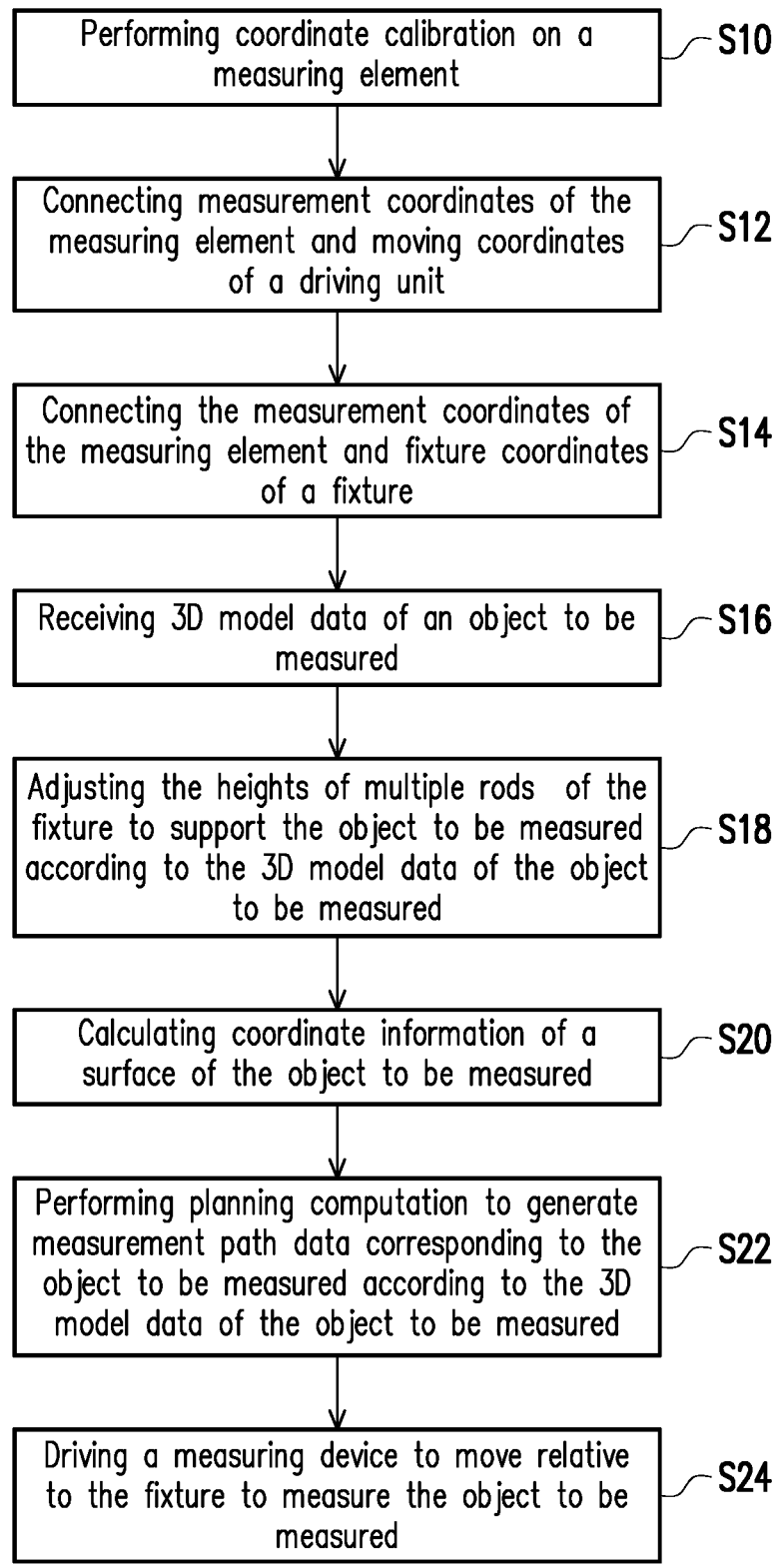
FIG. 4 is a flow chart of a 3D measuring method according to an embodiment of the disclosure.

FIG. 4 is a flow chart of a 3D measuring method according to an embodiment of the disclosure. Referring to FIG. 1 and FIG. 4, a 3D measuring method of the embodiment includes the following. The 3D model data of the object 50 to be measured is obtained in step S16. The heights of the rods 122 of the fixture 120 are adjusted according to the 3D model data of the object 50 to be measured to support the object 50 to be measured in step S18. The rods 122, for example, contact the lower surface 52 of the object 50 to be measured. The measuring element 140 is driven to move relative to the fixture 120 to measure the object 50 to be measured in step S24.

In the 3D measuring method of the embodiment, the heights of the rods 122 of the fixture 120 may be adjusted to be adapted to the various objects 50 to be measured, thereby reducing the design and manufacturing cost of the exclusive fixture.

Referring to FIG. 1 and FIG. 4 again, the detailed steps of the 3D measuring method of the embodiment are described below; however, the disclosure is not limited thereto. First, in step S10, calibration is performed on measurement coordinates (including a coordinate axis Xa, a coordinate axis Ya, and a coordinate axis Za,) of the measuring element 140 itself, and the calibration is recorded in the controller 150. Next, in step S12, a reliable reference point (not shown) set on the base 110 in advance is measured, and a value obtained in the measurement of the reference point is transmitted to the controller 150 for calculation so that the measurement coordinates of the measuring element 140 and moving coordinates (including the coordinate axis Xm, the coordinate axis Ym, and the coordinate axis Zm) of the driving unit 130 are connected. Next, in step S14, a reliable reference point (not shown) on the fixture 120 is measured, and a value obtained in the measurement of the reference point is transmitted to the controller 150 for calculation so that the measurement coordinates of the measuring element 140 and fixture coordinates (including a coordinate axis Xj, a coordinate axis Yj, and a coordinate axis Zj) of the fixture 120 are connected. The measurement coordinates are connected to the moving coordinates and the fixture coordinates and recorded in the controller 150.

When performing measurement on the object to be measured, the 3D model data of the object 50 to be measured is input in the controller 150 in step S16. The controller 150 calculates the best placement posture of the object 50 to be measured according to a working distance, a measurement range, and an incident angle range of the measuring element 140 and a moving range of the driving unit 130. The placement posture corresponds to the proper height of each of the rods 122.

Next, in step S18, the height of each of the rods 122 is adjusted according to a calculation result of the controller 150, and the driving unit 130 is controlled to adjust the height of each of the rods 122 so that the rods 122 support the object 50 to be measured. In the embodiment, each of the rods 122 contacts the lower surface 52 of the object 50 to be measured.

Next, coordinate information of the surface of the object 50 to be measured in the current placement posture of the object 50 to be measured is calculated in step S20. In addition, the planning computation is performed to generate the measurement path data corresponding to the object 50 to be measured according to the 3D model data of the object 50 to be measured in step S22. The height of each of the rods 122 and the 3D model data of the object 50 to be measured are considered, and the connection of the measurement coordinates, the moving coordinates, and the fixture coordinates obtained in the previous steps is adopted to perform coordinate conversion. Then, a measurement path of the measuring element 140 and the corresponding measurement path data are planned. Since the measurement path data is planned in advance, the measurement accuracy may be increased. Note that during the planning computation, the controller 150 performs the planning computation to generate the measurement path data corresponding to the object 50 to be measured by minimizing the rotating angle of the uniaxial rotation of the measuring element 140 according to the 3D model data of the object 50 to be measured.

Next, in step S24, the measuring element 140 measures the object 50 to be measured, such as the upper surface 54, a side surface, or other parts of the object 50 to be measured, according to the measurement path data. The data measured by the measuring element 140 are combined to be actual coordinate information of the upper surface 54 of the object 50 to be measured through the coordinate conversion.

In summary of the above, in the 3D measuring equipment and the 3D measuring method of the disclosure, since the fixture may be configured to support the object to be measured with various different appearances, thereby reducing the design and manufacturing cost of the exclusive fixture. In addition, the posture of the object to be measured when being measured may be adjusted to accelerate the measurement and increase the measurement accuracy. Furthermore, the integrated measuring equipment system is also favorable for coordinate conversion and may increase the measurement accuracy.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A 3D measuring equipment, comprising:
a base;

a fixture disposed on the base and for an object to be measured to be disposed thereon, wherein the fixture comprises a plurality of rods, and a plurality heights of the rods are adjustable;

a measuring device installed on the base, wherein the measuring device is movable relative to the fixture;

a controller signally connected to the measuring device and the fixture and configured to:

adjust the heights of the rods according to 3D model data of the object to be measured to support the object to be measured, and drive the measuring device to move relative to the fixture to measure the object to be measured.

2. The 3D measuring equipment according to claim 1, wherein, according to measurement path data corresponding to the object to be measured, the controller drives the measuring device to measure the object to be measured based on the measurement path data.

3. The 3D measuring equipment according to claim 2, wherein the measuring device comprises:

a driving unit installed on the base and signally connected to the controller; and a measuring element installed on the driving unit, wherein the controller drives the driving unit to drive the measuring element to measure the object to be measured based on the measurement path data.

4. The 3D measuring equipment according to claim 3, wherein the driving unit drives the measuring element to perform tri-axial movement and uniaxial rotation.

5. The 3D measuring equipment according to claim 4, wherein the controller is further configured to:

perform planning computation to generate the measurement path data corresponding to the object to be measured by minimizing a rotating angle of the uniaxial rotation of the measuring element according to the 3D model data of the object to be measured.

6. The 3D measuring equipment according to claim 3, wherein the measuring element is a distance measuring element.

7. The 3D measuring equipment according to claim 2, wherein the controller is further configured to:

perform planning computation to generate the measurement path data corresponding to the object to be measured according to the 3D model data of the object to be measured.

8. The 3D measuring equipment according to claim 1, wherein the controller adjusts the heights of the rods so that the rods located below the object to be measured contact a lower surface of the object to be measured.

9. The 3D measuring equipment according to claim 8, wherein the fixture further comprises a base plate element disposed on the base, the rods are disposed on the base plate element and are perpendicular to the base plate element, the controller adjusts the heights of the rods so that each angle between a normal vector of each point of an upper surface of the object to be measured and a height direction of the rods is less than a predetermined value.

10. The 3D measuring equipment according to claim 8, wherein the fixture further comprises a base plate element disposed on the base, the rods are disposed on the base plate element and are perpendicular to the base plate element, the controller adjusts the heights of the rods so that a summation of angles between normal vectors of all points of an upper surface of the object to be measured and a height direction of the rods is a minimum.

11. The 3D measuring equipment according to claim 8, wherein the controller adjusts the heights of the rods to minimize a deviation between the heights of the rods and an average height of the rods.

12. A 3D measuring method, comprising:

obtaining 3D model data of an object to be measured;

adjusting a plurality of heights of a plurality of rods of a fixture according to the 3D model data of the object to be measured to support the object to be measured; and driving a measuring device to move relative to the fixture to measure the object to be measured.

13. The 3D measuring method according to claim 12, wherein, according to measurement path data corresponding to the object to be measured, the measuring device is driven to measure the object to be measured based on the measurement path data.

14. The 3D measuring method according to claim 13, wherein a measuring element of the measuring device performs tri-axial movement and uniaxial rotation to measure the object to be measured according to the measurement path data.

15. The 3D measuring method according to claim 14, wherein planning computation is performed to generate the measurement path data corresponding to the object to be measured by minimizing a rotating angle of the uniaxial rotation of the measuring element according to the 3D model data of the object to be measured.

16. The 3D measuring method according to claim 13, wherein planning computation is performed to generate the measurement path data corresponding to the object to be measured according to the 3D model data of the object to be measured.

17. The 3D measuring method according to claim 12, wherein the heights of the rods are adjusted so that the rods located below the object to be measured contact a lower surface of the object to be measured.

18. The 3D measuring method according to claim 17, wherein the heights of the rods are adjusted so that each angle between a normal vector of each point of an upper surface of the object to be measured and a height direction of the rods is less than a predetermined value.

19. The 3D measuring method according to claim 17, wherein the heights of the rods are adjusted so that a summation of angles between normal vectors of all points of an upper surface of the object to be measured and a height direction of the rods is a minimum.

20. The 3D measuring method according to claim 17, wherein the heights of the rods are adjusted to minimize a deviation between the heights of the rods and an average height of the rods.

21. The 3D measuring method according to claim 12, wherein a measuring element of the measuring device measures a distance between the measuring element and an upper surface of the object to be measured.

* * * * *